Aug. 3, 1965
R. W. BRUNDAGE
3,198,127
HYDRAULIC PUMP OR MOTOR
Original Filed May 19, 1959
2 Sheets-Sheet 1
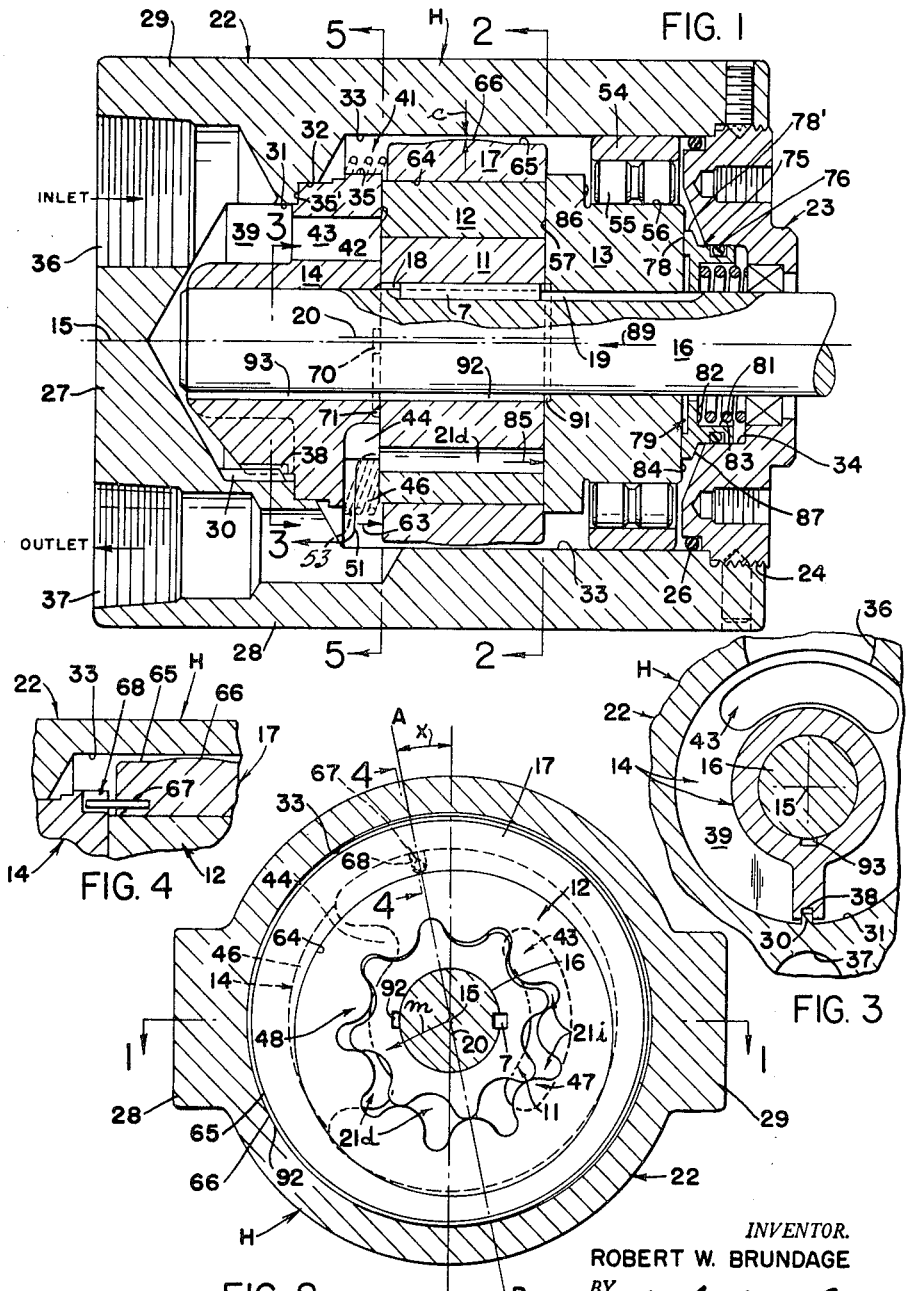
INVENTOR.
ROBERT W. BRUNDAGE
BY
Alfred C. Body
ATTORNEY

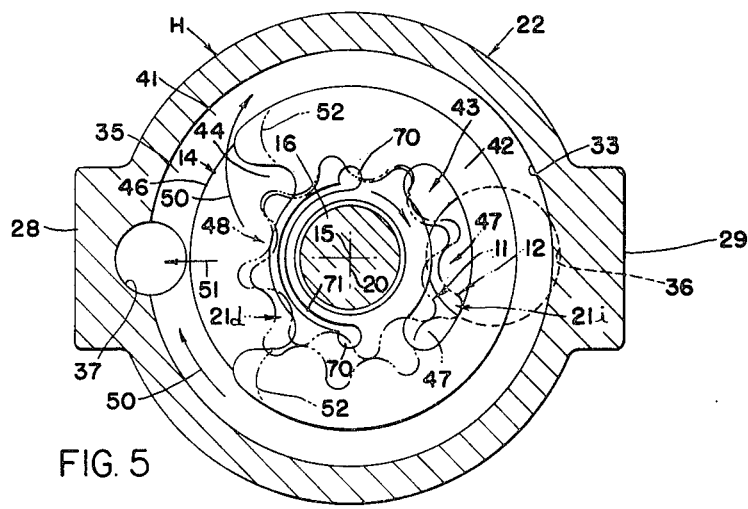

United States Patent Office 3,198,127
Patented Aug. 3, 1965

3,198,127
HYDRAULIC PUMP OR MOTOR
Robert W. Brundage, 2809 Wakonda Drive, Belnor, St. Louis, Mo.
Original application May 19, 1959, Ser. No. 814,320, now Patent No. 3,034,448, dated May 15, 1962. Divided and this application Feb. 26, 1962, Ser. No. 175,481
9 Claims. (Cl. 103—126)

This application is a division of my copending application Serial No. 814,320, filed May 19, 1959, now Patent No. 3,034,448, issued May 15, 1962.

This invention pertains to the art of hydraulic pumps or motors, and more particularly to a hydraulic pump or motor of the positive displacement type.

The invention is particularly applicable to what is generally known as internal gear-type pumps and will be described with particular reference thereto, although it will be appreciated that the invention in some of its aspects has broader applications, and in many instances may be applied to internal gear-type motors or to vane or rotating cylinder type hydraulic pumps or motors or, insofar as the lubrication of sleeve type bearings is concerned, to external type gear pumps.

Furthermore, the present invention is particularly applicable to hydraulic pumps or motors operable at what may be termed very high hydraulic pressures; that is to say, above 1,000 pounds per square inch and oftentimes approaching or exceeding 4,000 pounds per square inch. At such pressures, constructions and expedients usable at the lower pressures are often unsatisfatcory and inapplicable to the problems where the higher pressures are encountered.

Internal gear-type hydraulic pumps are normally comprised of an internally toothed and an externally toothed gear members rotatable on spaced axes in a housing with the teeth of the gears in sliding, sealing engagement. The externally toothed gear is supported on a shaft rotatably mounted in the housing. The internally toothed gear in turn is mounted for rotation on an axis spaced from that of the shaft by means of an eccentric bearing ring having eccentric inner and outer surfaces, which ring is in turn supported within the housing. Sealing members engage the axial faces of the gear members so that when the gear members rotate, they will define a plurality of closed chambers revolving about the axis and progressively increasing to a point of maximum volume which corresponds to the point of open mesh of the gears and then to a point of minimum volume which corresponds to the point of closed mesh of the gears. Normally, the chambers which are decreasing in volume communicate with a discharge port and are at high hydraulic pressures while the chambers which are increasing in volume communicate with an inlet port and are at relatively low pressures.

In high pressure hydraulic pumps and motors a serious problem has been in maintaining a lubricating film between relatively rotating cylindrical surfaces having high radial forces therebetween, such as: in the sleeve bearing of an external gear type pump supporting its shaft for rotation; or in the eccentric bearing ring of an internal gear type pump supporting the internally toothed gear for rotation. The lubricating film often breaks down under the high radial forces with the result that there is metal-to-metal contact, wear and possibly scoring of the surfaces.

Fluid film lubrication would prevent this, but heretofore has been difficult, if not impossible, to achieve. Whether such type of lubrication is obtained depends on several variables including the length to diameter ratio of the surfaces, the viscosity of the lubricant and the radial pressure or load between the surfaces.

Most hydraulic pumps or motors are lubricated internally by the hydraulic fluid being pumped, but fluids suitable for pumping usually have insufficient viscosity for fluid film lubrication, particularly when the fluids are heated above 100° F. by the pumping action.

Also, in internal gear type pumps the length to diameter ratio of the bearing ring and gear surfaces is necessarily low.

The present invention overcomes these difficulties by two steps, each of which is believed novel, but in combination enables fluid film lubrication to be obtained on any sleeve type bearing surface in a high pressure pump or motor.

Thus, in accordance with the invention, both axial ends of the sleeve bearings are at the high fluid discharge pressure, thus making use of the fact that the viscosity of a lubricant increases with pressure. This is accomplished in an internal gear type pump or motor by maintaining the entire housing cavity in which the gears and eccentric bearing ring are located at the high pressure.

The result is that as the output pressure of the pump or motor is increased resulting in higher pressure between the surfaces. The viscosity of the lubricating fluid is also increased so that as the need for the fluid film lubrication increases, the ability to provide such lubrication also increases. It is believed that I am the first to ever have appreciated this fact in a hydraulic pump.

The other step in accordance with the invention, is the provision of means for sealing closing at least one axial end of the space between the surfaces.

In an internal gear type hydraulic pump, this is accomplished in accordance with the invention, by providing a sealing surface engaging an axial face of both the eccentric bearing ring and the internally toothed gear member together with means for biasing both members relatively towards the sealing surface.

The principal object of the invention is the provision of a new and improved hydraulic pump which is simple in construction, which is economical to manufacture, and which is capable of pumping high fluid pressures at high mechanical and volumetric efficiencies at all rotational speeds.

Another object of the invention is the provision of a new and improved hydraulic pump which will have long life and will operate at a low noise level.

Another object of the invention is the provision of a new and improved hydraulic pump or motor wherein fluid film lubrication is readily obtained.

Still another object of the invention is the provision of a new and improved hydraulic pump or motor having sleeve type bearings to be lubricated wherein the viscosity of the lubricant varies proportionally to the pressure loading on the bearing.

Another object of the invention is the provision of a new and improved hydraulic pump or motor having sleeve bearings to be lubricated wherein means are provided for closing at least one axial end of the sleeve bearing to increase the effective length to diameter ratio thereof.

Another object of the invention is the provision of a new and improved hydraulic pump or motor lubricated by the fluid being employed wherein fluid film lubrication will be maintained at all times and the pump or motor will have a minimum of wear and a minimum of friction.

Still another object of the invention is the provision of a new and improved hydraulic pump of the internal gear type where means are provided for closing one axial end of the bearing between the internally toothed gear and its supporting bearing member whereby to provide an improved fluid film lubrication therebetween.

The invention may take physical form in certain parts and arrangements of parts, a preferred embodiment of which will be described in detail in this specification and illustrated in the accompanying drawing which is a part hereof and wherein:

FIGURE 1 is a side cross sectional view of a hydraulic pump illustrating a preferred embodiment of the invention, the section being taken approximately on the line 1—1 of FIGURE 2;

FIGURE 2 is a cross-sectional view of FIGURE 1 taken approximately on the line 2—2 thereof and turned through an angle of 90°;

FIGURE 3 is a fragmentary cross-sectional view of FIGURE 1 taken approximately on the line 3—3 thereof;

FIGURE 4 is a fragmentary cross-sectional view of FIGURE 2 taken approximately on the line 4—4 thereof;

FIGURE 5 is a cross-sectional view of FIGURE 1 and turned through an angle of 90° taken approximately on the line 5—5 thereof with the gear teeth being superimposed thereon to show the relationship of the gear teeth to the inlet and outlet ports; and, FIGURE 6 is a fragmentary view of FIGURE 1 showing the pressure characteristics of fluid film lubrication obtained between the eccentric ring member and internally toothed gear.

Referring now to the drawings wherein the showings are for the purposes of illustrating a preferred embodiment of the invention only and not for the purposes of limiting same, the figures show a hydraulic pump comprised of a housing H having an internal pumping cavity in which are mounted a plurality of pumping members defining a plurality of closed chambers which progressively increase and decrease in volume as the members move relative to each other. While such members may take a number of conventional forms, such as rotating cylinders with axially reciprocating pistons, or rotating vanes, or the like, in the embodiment of the invention shown, they comprise generally an externally toothed gear member 11, an internally toothed gear member 12, sealing and manifold members 13, 14 one engaging the right and the other the left hand axial faces of the gears 11, 12 respectively.

PUMPING MEMBERS

The gear member 11 is supported for rotation on the axis 15 of a shaft 16 and keyed thereto by a key 7 fitting into keyways 18, 19 on the gear 11 and shaft 16 respectively. The internally toothed gear member 12 is supported for rotation about an axis 20 spaced from the axis 15 in a bearing member 17 which, as will appear, is loosely mounted within the housing cavity. The spacing of these axes will be referred to hereinafter as the "gear eccentricity." The gear member 12 has one tooth more than that of the gear member 11 and these teeth are in sliding, sealing engagement so that as the gear members 11, 12 rotate they, along with the sealing and manifold members 13, 14, define a plurality of closed pumping chambers 21i and 21d which revolve on a closed path of movement and progressively increase in volume from a point a of minimum volume to a point b of maximum volume and then decrease to the point of minimum volume a. These points a and b define what may be termed a neutral plane A, B through the two axes of rotation and it will be further noted that the gear teeth at the point A are in what may be termed "closed mesh" and at the point B at "open mesh."

HOUSING

The housing H in the embodiment shown is formed in two parts, namely, a main part 22 generally in the shape of a cup, and a closure part 23 removably positioned in the open end of the cup 22 by any suitable means, but preferably by means of threads 24. An O-ring 26 between opposed surfaces of the two parts and on the cavity side of the threads 24 provides a seal to prevent leakage of the hydraulic fluids longitudinally past the threads 24.

The main part 22 includes a base 27 and a side wall having a pair of external, diametrically opposed longitudinally extending ribs 28, 29. The side wall defines a plurality of inwardly facing generally cylindrical surfaces 31, 32, 33 which are progressively larger in diameter reading from left to right. In a like manner, the closure part 23 has a cylindrical surface 34 into which slidingly supports a sealing ring 75.

The surface 31, has a pair of diametrically-opposite, axially-extending lugs 30 aligned with the ribs 28, 29. Inlet opening 36 is drilled through the base 27 aligned with rib 29 in such a manner as to intersect with surface 31 and remove one of these lugs.

MANIFOLD MEMBER

The manifold member 14 is fixedly mounted in the housing in any suitable manner, but in the embodiment shown has a cylindrical surface 35 fitting within the surface 32 and an axially facing surface 35' bearing against the shoulder between the surfaces 32 and 31.

The shaft 16 extends into and is rotatably supported in the member 14, it being noted that by virtue of the design features of the pump that a simple inexpensive sleeve type bearing is employed.

The manifold member 14 defines, along with the cylindrical surface 31, a housing cavity 39 communicating with an inlet opening 36. This cavity 39 is at inlet pressure.

The manifold member surface 35 extends beyond the cylindrical surface 32 and defines with the cylindrical surface 33 and the left hand axial end of the bearing member 17, a housing cavity 41 generally in the shape of a ring which communicates with an outlet opening 37.

The manifold member 14 has on its right hand axial end a surface 42 in sealing engagement with the left hand axial face of the gears 11, 12. An inlet manifold port 43 extending in an arcuate direction in the path of movement of the pumping chambers is formed in the sealing face 42 and extends axially through the manifold member 14 to communicate with the cavity 39.

Additionally, an outlet manifold port 44 is formed in the sealing surface 42 diametrically opposite from the inlet manifold 43 which also extends in an arcuate direction in the line of movement of the pumping chambers. A passage 46 which in this instance simply forms a radial extension of the manifold 44 communicates the port 44 with the housing cavity 41. This cavity 41 houses both gears 11, 12, the sealing member 13 and the bearing ring 17 and as an important part of the invention, is at discharge pressure.

The formation of the manifold ports 43, 44 in the surface 42 leaves portions of the sealing surface between the arcuate ends of the manifold and in the chamber path of movement which forms open mesh land 47 and closed mesh land 48, each having a line of movement width slightly greater than (by about 10°) the line of movement width of one pumping chamber, that is to say, the line of movement width between the points of contact of adjacent teeth on one of the gears with adjacent teeth on the other of the gears.

It will be appreciated that as the gears revolve, there may be a slight variation in the line of width movement of each chamber. The line of movement width referred to is that width existent at the instant when a chamber is adjacent a land.

The manifold ports 43, 44 and the lands 47, 48 are symmetrically arranged relative to the inlet and outlet openings 36, 37 and are held in this relationship by means of an axially extending groove 38 which fits over and engages the lug 30 on the cylindrical surface 31.

The sealing surface 42 also has a pair of diametrically opposite balancing ports 70, each located on the land mid line and spaced from the axis 15 so that for the instant when a chamber is adjacent to and thus closed by a land, the ports will be open to such chamber. An arcuate groove 71, also in the sealing surface, intercommunicates the trapping ports 70 and in conjunction with the face of the gear 11 forms a leakage passage between such ports of a limited but predetermined leakage resistance. The function of these ports and leakage groove will be described more fully hereinafter.

With the arrangement shown, and with the clockwise rotation of the gears 11, 12 shown in FIGURE 5, the hydraulic fluids leaving the decreasing volume chambers 21i have a substantial circumferential velocity component with the result that some of the fluid flows circumferentially through the ring-shaped cavity 41, as indicated by the flow line 50, to reach the outlet opening 37 giving a cooling action to the portions of the pump members adjacent to the cavity 41. The remainder of the hydraulic fluid flows directly outwardly through the outlet opening 37, as indicated by the flow line 51. This flow of fluid also has another important function, as will appear hereinafter.

If it is desired to increase the proportion of the fluid flowing in the flow path 50, it is possible to shape the sides defining the passage 46, as indicated by the dotted line 52.

SEALING MEMBER

The sealing member 13 is mounted on the shaft 16 and desirably forms an integral part thereof. It may be welded thereto, but in the preferred embodiment, has an interference fit with the shaft.

The sealing member 13 and shaft 16 are mounted for limited axial movement and for rotation within the housing H by any suitable means, such as a roller bearing consisting of an outer race 54 press-fitted into the housing H and a plurality of circumferentially spaced cylindrical rollers 55 engaging an outer cylindrical surface 56 on the sealing member 13.

The plane of the bearing is spaced a predetermined distance from the axial center of the gears whereby the force moments of the high pressures on the member 13 are approximately equal, opposite, and thus generally in balance.

The sealing member 13 has a surface 57 which extends radially outwardly beyond the outer surface of the ring gear and is in sealing engagement with the right hand axial faces of the gears 11, 12 to close the right axial end of the chambers 21. The high pressure fluid in the high pressure chambers exerts a radially off-set axial force indicated by the vector 85 to the right on the member 13, which force is opposed by means of the discharge pressure in the cavity 41 exerting an axial force indicated by the vector 89 on the surfaces 84 and 86 of the sealing member 13 facing in an axial direction opposite to that of the surface 57.

The size of the force 89 is equal to the product of the hydraulic pressure and the sum of the area of the surfaces 84 and 86 exposed to such pressures. Preferably, the size of the force 89 is approximately 14% greater than the size of the force 85.

The area of the surface 84 exposed to the high pressures in the housing cavity 41 is limited or restricted by means of the sealing ring 75.

SEALING RING

The sealing ring 75 is generally in the shape of a sleeve and is axially slidable in a sealed relationship with the housing cavity defined by the cylindrical surface 34 by means of an O-ring 76 mounted in a groove on the outer surface of the ring. The ring 75 surrounds the shaft 16 and has a left hand axially facing surface 78 formed on a radially outwardly extending flange 78' in pressure sealing relationship with the right hand axially facing surface 84 of the sealing member 13. The ring 75 thus defines an internal cavity 79 which is at inlet pump pressure, it being noted that the cavity 79 is communicated with the inlet through the keyway 19, a small counterbore 91 in the surface 57, an opposite keyway 92 in the gear 11, and a groove or passage 93 in the manifold member 14.

A helical compression spring 81 between the base of the housing part 23 and a base 82 of a counterbore 83 in the sealing ring 75 biases the surfaces 78, 84 into a limited pressure engagement. It is to be noted that this spring also presses the sealing member 13 into engagement with the axial faces of the gear 11, 12 and presses the gear 11, 12 into pressure engagement with the sealing surface of the manifold member 14. The spring 81 is relatively weak and simply provides an initial force to maintain the various surfaces in pressure engagement when the pump is not operating or when it is started into operation. The principal sealing force is the hydraulically produced force above referred to.

The surface 78 engaging the surface 84 seals the high pressure in the pump cavity 41 from the inlet and as described in my copending application, Serial No. 613,235, the ring 75 has an outwardly extending flange having a right-hand axially facing surface 87 on the flange 78' exposed to this hydraulic pressure, the area of which surface 87 is so proportioned that the force produced between the surfaces 78 and 84 is just equal to the force of the pump discharge pressure tending to separate these surfaces.

ECCENTRIC BEARING MEMBER

The eccentric bearing member 17, is radially movable within limits within the pump housing H.

Thus, the bearing member 17 is in the shape of a ring having an inner cylindrical surface 64 in which the internally toothed gear 12 is rotatably supported and thus has an axis corresponding to the axis 20.

The bearing member 17 also has an outer generally cylindrical surface 65 having an axis spaced from the axis 20, the spacing being hereinafter referred to as the bearing member eccentricity, which eccentricity is generally close to, but not necessarily equal to, the gear eccentricity.

The bearing member 17 is held against rotation in a manner such as to permit a limited degree of radial and axial movement. Thus in the embodiment of the invention shown, a pin 67 extends axially from the left hand side of the bearing member 17 into a slot 68 in the right hand face of the manifold member 14. This slot has a circumferential width somewhat greater than the diameter of the pin and a radial and axial depth such that the pin 67 is loosely engaged therein.

The pin 67 is positioned on the neutral axis and on the closed mesh side of the bearing member 17, while the slot 68 is spaced from the midline of the open mesh land 47 by an angle $x$. This angle $x$ will be referred to as the trapping angle and as used in this specification is always measured from the land midline to the neutral axis opposite to the direction of rotation. The purpose and size of this angle will be described in greater detail hereinafter.

The surface 65 has a spherical bead 66 extending around its entire outer periphery, which shape assists in the member 17 aligning itself with the surface 33. This surface thus does not need to be reamed. The outer diameter of bead 66 is less than the diameter of the surface 33 by a predetermined amount to provide a nominal clearance $c$, hereinafter referred to as the bearing ring clearance. This clearance may vary from .002 to .010 inch maximum. It is obvious that as the bearing member 17 moves radially within the housing H, the clearance will not be uniform around its entire periphery, but will, in fact, vary from zero where the bearing ring contacts the surface 33 to twice the clearance diametrically opposite from the point of contact. In this respect it is to be noted that two circles can only be tangent at one point, which point is on the common line through the centers of curvature.

FLUID FILM SUPPORT LUBRICATION

The bearing member 17 provides what is known as a sleeve-bearing support for the rotation of the internally toothed gear 12, namely, of two cylindrical surfaces rotating relative to each other one inside the other.

Fluid film support lubrication is maintained between these surfaces. By fluid film support is meant that the pressure developed in the lubricating film between the surfaces due to the relative rotation thereof exerts a radial separating force on the surfaces greater than the forces of the radial load which the bearing must carry.

To obtain fluid film support-type lubrication, the following relationship must be maintained:

$$\frac{Z \times N \times C}{P} \text{ must be more than 25}$$

where Z equals the absolute viscosity of the lubrication fluid in centipoises, N equals the speed of rotation in r.p.m., P is the unit pressure of the load on the surfaces in pounds per square inch, and C is a correction factor which is a hyperbolic function of the length to diameter ratio of the surfaces and varies asymptotically from a maximum at large ratios to a minimum of approximately 10% for small ratios. It is to be noted that the friction of such a bearing support is a minimum when the value of this formula is 25, increases slowly as the value increases over 25, and increases rapidly as the value decreases below 25.

The bearing support for the internally toothed gear of an internal gear pump must necessarily have such a small length to diameter ratio as to make satisfying of the requirement for fluid film support difficult. The same is true of the viscosity of hydraulic fluids suitable for pumping in high pressure hydraulic pumps.

To satisfy the requirements for fluid film type lubrication, and in accordance with the present invention, use is made of the fact that the viscosity of a hydraulic fluid increases substantially with an increase in fluid pressure. Thus in accordance with the invention, both axial ends of the space between the bearing surfaces are at the high pump discharge pressure. The result is that as the radial loads on the surfaces increase due to increase of pump pressure, the viscosity of the lubricating fluid also increases so that one increase is compensated by the other and the relationship above stated can be maintained.. It is believed that I am the first to ever have operated the bearing surfaces of an eccentric bearing ring of an internal gear type pump at the pump discharge pressure or for that matter any sleeve type bearing of a hydraulic pump or motor having the full radial load thereon.

Furthermore, in accordance with the invention, the effective length to diameter ratio of the surfaces is increased by closing one axial end of the space between the surfaces. In the embodiment of the invention shown, this is done by having the sealing surface 57 extend radially outwardly beyond the outer surface of the gear 12 and having the corresponding axial end of the bearing member 17 in sealing engagement therewith. Thus in accordance with the invention, the bearing member 17 is also axially movable and means are provided for biasing or urging the ring 17 into engagement with the surface 57.

The results of this arrangement are shown in FIGURE 6. Thus curve 60 shows the variations in the pressures developed between the surfaces as a function of the distance from each axial end of the surfaces in a bearing of conventional construction wherein both axial ends of the surfaces are open. Curve 61 shows the pressures which may be developed between the surfaces when one axial end of the space between the surfaces is closed, as in accordance with the present invention. It will be noted that the area under the curve 61 is substantially greater than the area under the curve 60 and thus the forces developed are substantially greater.

Various means may be provided for biasing the bearing member 17 in an axial direction, but in the preferred embodiment the flow of fluid as indicated by the line 51 from the high pressure chambers to the outlet opening 37 is so directed as to flow past the axial end of the bearing member 17 opposite from the surface 57 and then to have its direction of flow changed away from the bearing member 17 such that the change in direction results in an impulse reaction or an axial force, as indicated by the vector 63, on the axial end of the bearing member 17. A spring 53 may also be used.

PERFORMANCE

Pumps constructed in accordance with the present invention have given rather startling performance characteristics.

Thus manufacturers of standard internal gear-type pumps recommend a maximum speed of 1200 r.p.m., a No. 20 minimum viscosity hydraulic oil, and maximum pressures of 1500 pounds per square inch, and these pressures only intermittently. Under these conditions, a volumetric efficiency of 80% and an over-all efficiency of 75% are indicated as typical.

Using a pump constructed in accordance with the present invention, however, and a No. 10 hydraulic oil, a volumetric efficiency of 98%, and an over-all efficiency of 93% are readily obtained at 2,000 pounds per square inch at a speed of 2,000 r.p.m. At 3500 pounds per square inch, volumetric efficiencies of 93% have been obtained, and the pump has operated satisfactorily at 5,000 pounds per square inch without any apparent damage to the bearing surfaces or the gear teeth.

The invention has been described in relation to a pump. Obviously, it is equally applicable to a motor taking into account that if the high pressure chambers remain the same, the direction of rotation will be reversed or if the direction of rotation remains the same, the high pressure pump chambers become low pressure and vice versa.

It will thus be seen that an embodiment of the invention has been described which accomplishes all of the objectives heretofore set forth, and others, and provides a hydraulic pump having a maximum of efficiency, a minimum of noise, and a minimum of wear.

The invention has been described with reference to a preferred embodiment. Obviously modifications and alterations will occur to others upon a reading and understanding of this specification, and it is my intention to include all such modifications and alterations insofar as they come within the scope of the present invention.

Having thus described my invention, I claim:

1. In a hydraulic pump comprised of a housing having an inwardly facing surface defining a pumping cavity; an externally toothed and an internally toothed gear member rotatable about spaced axes and defining a plurality of progressively increasing and decreasing volume pumping chambers, said gears each having an axially facing surface, a bearing member rotatably supporting said internally toothed gear and having an axially facing sealing surface, a sealing member having an opposite axially facing sealing surface engaging the gear sealing surfaces, the improvement which comprises said sealing member sealing surface extending radially beyond the periphery of said internally toothed gear member, said bearing member being axially movable in said housing and means biasing said bearing member sealing surface against said sealing member sealing surface.

2. The improvement of claim 1 wherein said biasing means comprises a spring biasing said bearing member sealing surface against said sealing member sealing surface.

3. The improvement of claim 1 wherein said means comprise means directing the discharging fluid from said pump across the axial end of said bearing member opposite from its sealing surface in such a manner that the movement of the fluid creates an axial force on said bearing member.

4. The improvement of claim 1 wherein means direct the flow of hydraulic fluid from said decreasing volume chambers radially across the axial end of said bearing member opposite from its sealing surface, and other means change the direction of flow of said fluid adjacent to said axial end in a direction away from said bearing member whereby an impulse pressure is created on the said axial end of said bearing member.

5. The improvement of claim 1 wherein both axial ends of said bearing member are at the discharge pressure of said pump.

6. In a hydraulic device of a general character described, a housing having an inwardly facing surface defining a chamber, a bearing member axially movable in said chamber and having an inwardly facing cylindrical surface and an axially facing sealing surface, an internally toothed gear member having an outwardly facing cylindrical surface rotatably journaled in said bearing member surface, a sealing member having an opposite axially facing sealing surface in sealing engagement with one axial end of said gear and extending radially outwardly beyond said gear cylindrical surface whereby said sealing member sealing surface faces said bearing member sealing surface and means biasing said bearing member axially against said sealing surface.

7. The combination of claim 6 wherein high pressure fluid flows in said device and the flow of high pressure fluid is directed past the axial end of said bearing member opposite from its sealing surface and immediately adjacent said end said flow has an abrupt change in direction away from said axial end whereby to create an impulse reaction force on said end of said bearing member.

8. The combination of claim 6 wherein high pressure oil flows in said device and said chamber and both axial ends of said bearing member are at said high pressure.

9. In a hydraulic device for handling oils at high pressure comprising in combination: a housing defining a cavity; an externally toothed gear rotatable in and on the axis of such cavity; an internally toothed gear having gear teeth in engagement with said externally toothed gear and having an outer cylindrical surface rotatable about an axis spaced from said externally toothed gear; a bearing surface facing said internally toothed gear cylindrical surface and having a diameter slightly greater than said cylindrical surface to provide a slight clearance therebetween adapted to receive a lubricant, said gear members defining a plurality of revolving chambers; a sealing member in sealing engagement with one axial end of each of said gears; a manifold member in sealing engagement with each of the other axial ends of said gears and having arcuate ports therein communicating with said chambers as they revolve and lands at each arcuate end of said ports, the line of movement width of said lands being slightly greater than the line of movement width of the openings from said chambers to said ports; the chambers on one radial side of the land mid line being at high discharge pressure whereby a resultant radially outward force is exerted on said internally toothed gear on the same side of the axis as the high pressure chambers, the improvement which comprises means communicating the oils at high discharge pressure to said cavity and both ends of said bearing surface whereby the clearance between said surfaces is filled with oil at high discharge pressure.

References Cited by the Examiner

UNITED STATES PATENTS

| 1,460,487 | 7/23 | Hawkins | 103—136 |
| 1,501,051 | 7/24 | Hill | 230—141 |
| 1,620,261 | 3/27 | Kennedy | 103—126 |
| 2,146,037 | 2/39 | Wahlmark | 103—126 |
| 2,159,720 | 5/39 | Wahlmark | 103—126 |
| 2,676,548 | 4/54 | Lauck | 103—126 |
| 2,694,367 | 11/54 | Seavey | 103—126 |
| 2,792,788 | 5/57 | Eames | 103—126 |
| 2,871,831 | 2/59 | Patin | 103—126 |
| 2,915,982 | 12/59 | Crandall | 103—126 |
| 2,918,877 | 12/59 | Woodcock | 103—136 |
| 2,968,251 | 1/61 | Eames et al. | 103—126 |
| 2,996,999 | 8/61 | Trautman | 103—126 |
| 3,034,448 | 5/62 | Brundage | 103—126 |

FOREIGN PATENTS

| 835,271 | 9/38 | France. |
| 14,968 | 1915 | Great Britain. |

JOSEPH H. BRANSON, JR., *Primary Examiner.*

WILBUR J. GOODLIN, *Examiner.*